(12) United States Patent
Vera et al.

(10) Patent No.: US 12,290,847 B2
(45) Date of Patent: May 6, 2025

(54) INFEED SYSTEM FOR HYDROLYZER

(71) Applicant: Bouldin Corporation, Morrision, TN (US)

(72) Inventors: Rodrigo B. Vera, Leeds, AL (US); David C. Palmer, Franklin, TN (US); Terry L. Moore, Brentwood, TN (US)

(73) Assignee: Bouldin Corporation, McMinnville, TN (US)

( * ) Notice: Subject to any disclaimer, the term of this patent is extended or adjusted under 35 U.S.C. 154(b) by 128 days.

(21) Appl. No.: 18/186,989

(22) Filed: Mar. 21, 2023

(65) Prior Publication Data

US 2024/0316607 A1  Sep. 26, 2024

(51) Int. Cl.
*B09B 3/32* (2022.01)
*B09B 3/40* (2022.01)

(52) U.S. Cl.
CPC .  *B09B 3/32* (2022.01); *B09B 3/40* (2022.01)

(58) Field of Classification Search
CPC ........ B09B 2101/25; B09B 3/32; B09B 3/40; B09B 3/45; B30B 9/3007; B30B 9/3046;
(Continued)

(56) References Cited

U.S. PATENT DOCUMENTS

| 4,099,457 A | 7/1978 | Hyden |
| 4,829,911 A | 5/1989 | Nielson |

(Continued)

FOREIGN PATENT DOCUMENTS

| JP | 60023716 A | 2/1985 |
| KR | 1020030053832 A | 7/2003 |

OTHER PUBLICATIONS

H.A. Torbert, D.L. Gebhart and R.R. Busby (2011). New Municipal Solid Waste Processing Technology Reduces Volume and Provides Beneficial Reuse Applications for Soil Improvement and Dust Control, Integrated Waste Management—vol. I, Mr. Sunil Kumar (Ed.), ISBN: 978-953-307-469-6, InTech, Available from: http://www.intechopen.com/books/integrated-waste-management-volume-i/new-municipal-solid-wasteprocessing-technology-reduces-volume-and-provides-beneficial-reuse-applica.

(Continued)

*Primary Examiner* — John J DeRusso
*Assistant Examiner* — Victoria Bartlett
(74) *Attorney, Agent, or Firm* — Lucian Wayne Beavers; Sam A. Raque; Patterson Intellectual Property Law, PC

(57) ABSTRACT

A hydrolyzer infeed system for supplying waste material to a hydrolyzer in a continuous manner, the infeed system comprises an infeed chamber, an inlet gate separate a chamber inlet from a chamber outlet, a ram disposed to reciprocate within the infeed chamber and compress waste material against the inlet gate when the gate is in the closed position and configured to push the compressed waste material past the inlet gate into a hydrolyzer when the gate is in an open position, an actuator operably coupled to the ram and configured to move the ram between retracted and extended positions. In one aspect, the ram extends past the inlet gate when in an extended position. In another aspect, an actuator position sensor operably coupled to the actuator generates a position signal representative of a position of the actuator and a corresponding position of the ram at all positions between the retracted ram position and the extended ram position.

15 Claims, 11 Drawing Sheets

(58) Field of Classification Search
CPC ............ F23G 2205/10; F23G 2205/18; F23K 2900/03001; B65F 1/1405; B65F 2210/162; B65F 2210/168
See application file for complete search history.

(56) References Cited

U.S. PATENT DOCUMENTS

| | | | |
|---|---|---|---|
| 5,328,562 | A | 7/1994 | Rafferty et al. |
| 5,558,281 | A | 9/1996 | Bouldin et al. |
| 5,772,134 | A | 6/1998 | Bouldin et al. |
| 6,017,475 | A | 1/2000 | Cantrell |
| 7,101,164 | B2 | 9/2006 | Bouldin |
| 7,303,160 | B2 | 12/2007 | Bouldin et al. |
| 7,311,504 | B2 | 12/2007 | Bouldin et al. |
| 7,449,330 | B2 | 11/2008 | Bouldin |
| 7,503,759 | B2 | 3/2009 | Bouldin |
| 7,842,486 | B2 | 11/2010 | Bouldin |
| 7,845,620 | B1 | 12/2010 | Bouldin |
| 7,883,331 | B2 | 2/2011 | Bouldin |
| 9,493,796 | B2 | 11/2016 | Medoff et al. |
| 9,555,415 | B2 | 1/2017 | Bouldin et al. |
| 9,562,322 | B1 | 2/2017 | Post |
| 9,700,896 | B1 | 7/2017 | Gitschel |
| 2001/0023749 | A1 | 9/2001 | Nay et al. |
| 2002/0003032 | A1 | 1/2002 | Nay et al. |
| 2004/0043097 | A1 | 3/2004 | Bouldin et al. |
| 2004/0043098 | A1 | 3/2004 | Bouldin |
| 2006/0024801 | A1 | 2/2006 | Holtzapple et al. |
| 2006/0144980 | A1 | 7/2006 | Bouldin et al. |
| 2009/0221814 | A1 | 9/2009 | Pschorn et al. |
| 2010/0065128 | A1 | 3/2010 | Benson et al. |
| 2012/0048975 | A1 | 3/2012 | Gitschel |
| 2013/0206345 | A1 | 8/2013 | Dauser |
| 2013/0236941 | A1 | 9/2013 | Walther et al. |
| 2013/0260433 | A1 | 10/2013 | Zhang |
| 2013/0327258 | A1* | 12/2013 | Sato ........................ F23G 5/444 110/255 |
| 2014/0110069 | A1 | 4/2014 | Rawls et al. |
| 2015/0233053 | A1 | 8/2015 | Stromberg |
| 2018/0037863 | A1 | 2/2018 | Foody et al. |
| 2018/0056617 | A1* | 3/2018 | Chan ..................... B30B 9/3082 |
| 2018/0119035 | A1 | 5/2018 | Tamir |
| 2018/0363017 | A1 | 12/2018 | Tolan et al. |
| 2020/0157739 | A1 | 5/2020 | Toll et al. |
| 2020/0332375 | A1 | 10/2020 | Bjrklund et al. |
| 2020/0390108 | A1 | 12/2020 | Wagler et al. |
| 2021/0207185 | A1 | 7/2021 | Bjrklund et al. |
| 2021/0254281 | A1 | 8/2021 | Melander et al. |
| 2022/0112659 | A1 | 4/2022 | Palmer |
| 2022/0145535 | A1 | 5/2022 | Ingolfsson et al. |
| 2022/0184862 | A1* | 6/2022 | Arbouzov .............. B29C 43/02 |

OTHER PUBLICATIONS

European Patent Office for corresponding patent application No. 23212039.4, dated Feb. 5, 2024, 18 pages (not prior art).
ERDC/CERL TR-08-13, "Hydrothermal Processing of Base Camp Solid Wastes to Allow Onsite Recycling", US Army Corps of Engineers (Sep. 2008)(41 pages).
General Kinematics De-Stoner Air Classifier (undated but admitted to be prior art)(1 page).
A-S-H Submerged Chain Conveyor System (2016)(4 pages).
Steinert NES Non-Ferrous Metal Separator (undated but admitted to be prior art)(6 pages).
SPYDIR-R NRT (undated but admitted to be prior art)(2 pages).
Uni-Shear SR900 Product Overview SSI (undated but admitted to be prior art)(4 pages).
Dual-Shear by SSI (undated but admitted to be prior art)(4 pages).
Figs. 1A-1E of the present application are admitted to be prior art.
Corresponding co-pending U.S. Appl. No. 18/157,858.
Corresponding co-pending U.S. Appl. No. 18/157,860.

* cited by examiner

INFEED SYSTEM FOR HYDROLYZER

FIELD OF THE DISCLOSURE

The present disclosure relates to an infeed system and method for supplying waste material, such as household garbage or municipal solid waste (MSW), to a hydrolyzer.

BACKGROUND

One system and method for supplying waste material to a hydrolyzer vessel is described in U.S. Pat. No. 7,303,160 assigned to Bouldin Corporation, the assignee of the present application, the details of which are incorporated herein by reference. The system and process described in the '160 patent evolved into part of the WastAway® system and method commercialized by Bouldin Corporation.

FIGS. 1A-1E of the present disclosure illustrate various operational views of a prior art version of the infeed system which is indicated by the numeral 10. The waste material 12 is received by the infeed assembly via an inlet chute 14 leading to a pipe sleeve 16.

The pipe sleeve 16 contains a ram 18 operably connected to a first hydraulic cylinder 20 to move the ram within the sleeve.

A sliding gate construction 22 with a gate plate 24 is mounted to a second hydraulic cylinder 26 to move the gate plate between an open position and closed position. The gate plate 24 includes an aperture 30 within the gate plate.

The ram is fully extended in FIG. 1A, the ram is fully retracted in FIG. 1B, and the ram is partially extended in FIG. 1C. In all of FIGS. 1A-1C, the gate plate is in the closed position, operationally disconnecting the pipe sleeve 16 from a chamber 28.

In FIGS. 1D-1E, the gate plate is in an open position, and the aperture 30 within the gate plate is aligned with the pipe sleeve, thus allowing the pipe sleeve 16 to be in fluid communication with the chamber 28.

In the process of supplying waste material 12 to the chamber 28, waste material flows from the inlet chute 14 into the pipe sleeve 16 when the ram is in the fully retracted position as shown in FIG. 1B. As shown in FIG. 1C, the ram can be in the partially extended position blocking flow of waste from the inlet chute to the pipe sleeve and compacting the waste material with other compacted material in the form of a plug 32 against the closed gate plate 24. FIG. 1D depicts the gate plate 24 moving to the open position, which is followed by the ram moving into the fully extended position as shown in FIG. 1E, pushing the plug 32 through the aperture 30 into the chamber 28. FIG. 1A depicts the gate plate moving to the closed position, cutting the plug 32 and allowing more waste material to be compacted by the ram 18 against the gate plate 24.

This system and process allowed the hydrolyzer to operate as a continuous hydrolyzer continuously transferring waste from an environment having an ambient temperature and/or pressure to an environment with elevated temperature and/or pressure (e.g., a hydrolyzer). This is in direct contrast to a traditional batch hydrolyzer, which must be loaded with a batch at an ambient temperature and/or pressure and allowed time to elevate to a desired temperature and/or pressure until the batch has processed.

SUMMARY OF THE DISCLOSURE

The present disclosure provides an improved system and method for supplying MSW and other waste material into a hydrolyzer in a continuous manner without the need to cut the plug of densified waste material with the sliding gate.

The present disclosure also relates to an apparatus and process by which to control the compaction and densification of an incoming MSW stream by precisely controlling the position, force, and timing of the movement of the ram and of the gate.

In one embodiment the hydrolyzer infeed system includes an infeed chamber, an inlet gate, a ram disposed to reciprocate in the infeed chamber for compressing material against the gate when the gate is in the closed position and for moving the compressed material past the gate when the gate is in the open position, and an actuator operably connected to the ram and configured to move the ram between a retracted ram position and a fully extended ram position, the ram extending past the gate toward the chamber outlet when the ram is in the fully extended ram position.

In another embodiment a hydrolyzer infeed system includes the same infeed chamber, ram, and gate, and further includes an actuator operably connected to the ram and configured to move between a first actuator position corresponding to a retracted ram position and a second actuator position corresponding to a fully extended ram position, and an actuator position sensor operably associated with the actuator and configured to generate a continuous position signal representative of a position of the actuator and a corresponding position of the ram at all positions between the retracted ram position and the fully extended ram position.

In another embodiment a method of operating a hydrolyzer infeed system includes providing the hydrolyzer infeed system with an infeed chamber including a chamber inlet for receiving material and a chamber outlet, an inlet gate disposed in the infeed chamber, and a ram disposed to reciprocate in the infeed chamber. The method includes closing the gate, receiving material through the chamber inlet into the infeed chamber between the ram and the closed gate, extending the ram towards the closed gate to compress material between the ram and gate and form a compressed material plug, opening the gate, further extending the ram past the open gate between the open gate and the chamber outlet thereby pushing the compressed material plug past the gate, retracting the ram to a position between the open gate and the chamber inlet, and reclosing the gate.

Numerous objects, features and advantages of the present invention will be readily apparent to those skilled in the art upon a review of the following description in conjunction with the accompanying drawings.

DETAILED DESCRIPTION

The Hydrolyzer

As used herein the term "hydrolyzer" refers to a vessel held at a pressure and/or temperature greater than ambient pressure and/or temperature. One example of such a hydrolyzer is generally described in U.S. Pat. No. 6,017,475. Other details of suitable hydrolyzer constructions are shown in U.S. Pat. Nos. 7,303,160; 7,883,331; and 9,555,415; the details of which are incorporated herein by reference.

Figure 1A:
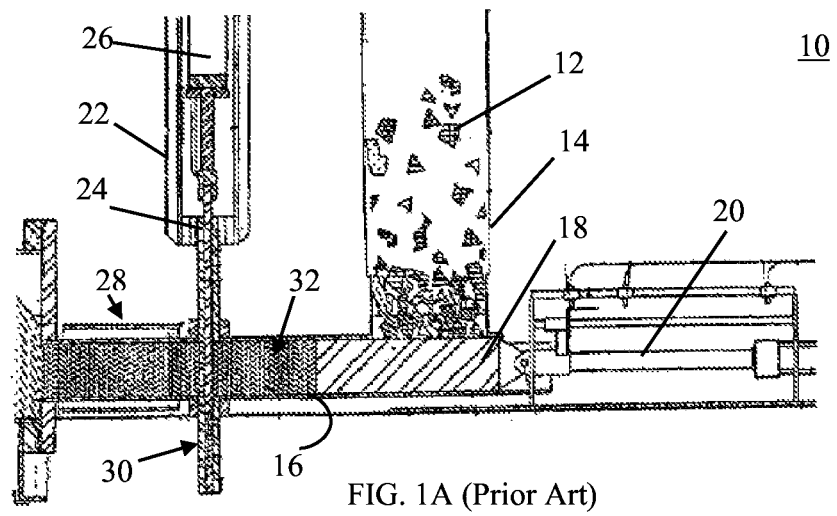
FIGS. 1A-1E are various operational views of an infeed system of the prior art.
Figure 1B:
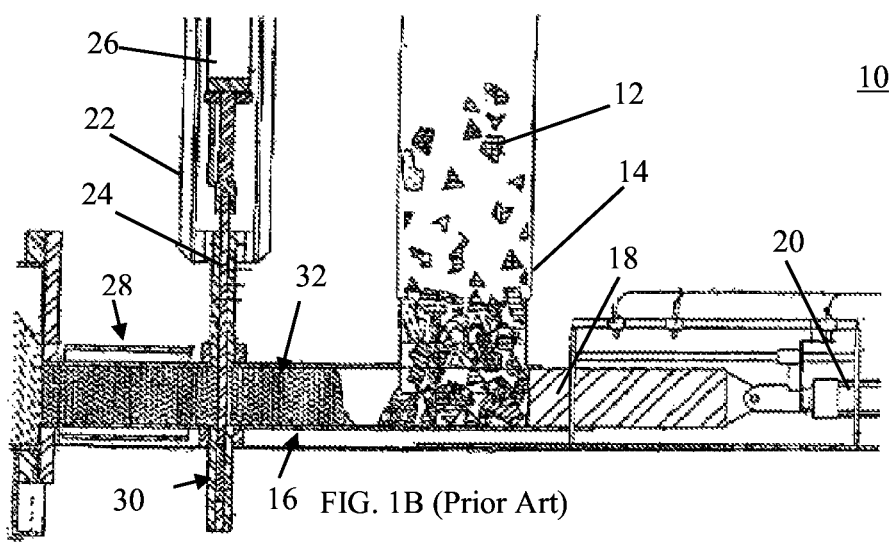
Figure 1C:
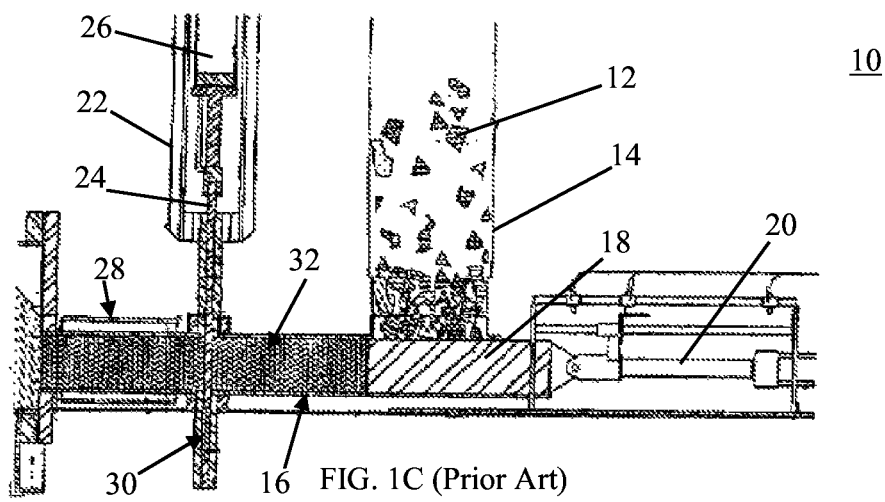
Figure 1D:
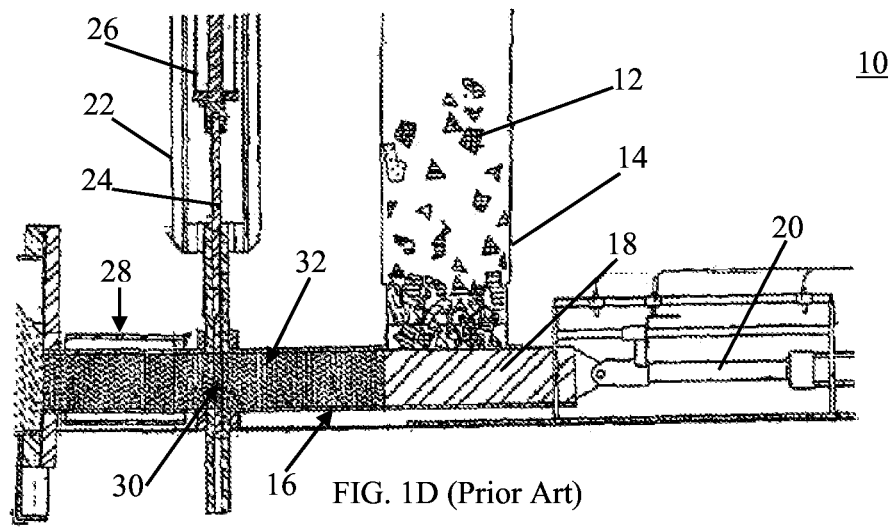
Figure 1E:
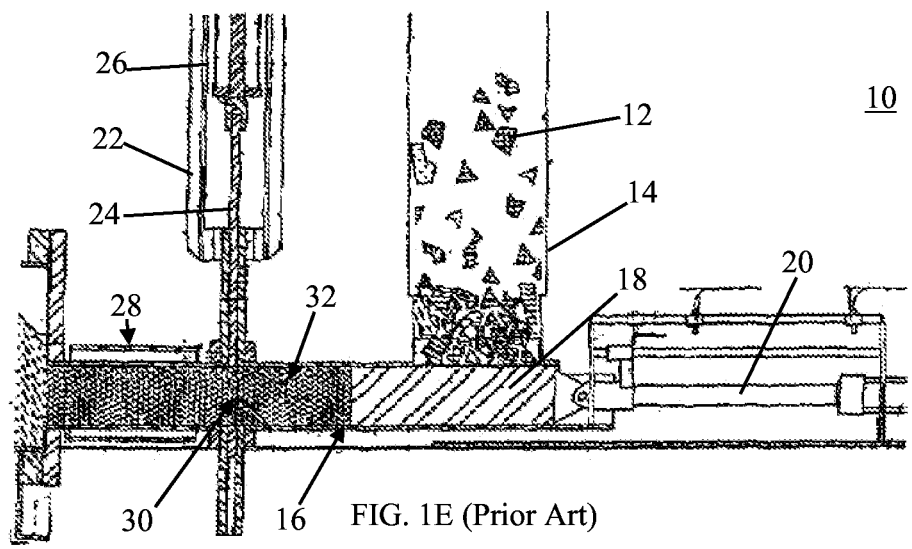
Figure 2:
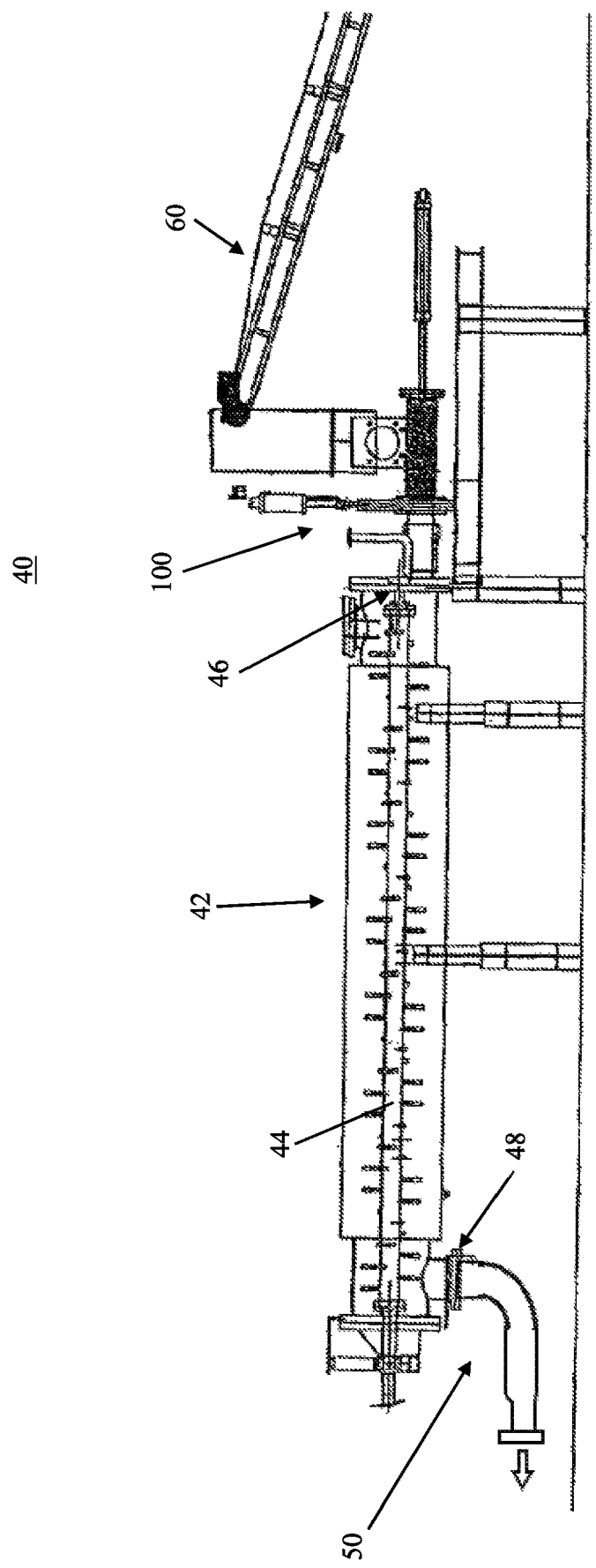
FIG. 2 is a schematic elevation view of a hydrolyzer system according to the present invention.

FIG. 2 schematically illustrates the hydrolyzer system 40 and certain improvements therein.

The hydrolyzer system 40 generally includes a hydrolyzer vessel 42, an infeed assembly 100 and an outfeed assembly 50. A conveyor 60 may convey waste material to the infeed assembly 100.

The hydrolyzer vessel 42 is sized and configured to expose the stream of waste material to steam at a pressure in a range of from 120 psi to 160 psi and a corresponding temperature in a range of from 300 degrees F. to 400 degrees F. for a time interval of from 10 to 30 minutes so that the steam crosses cell membranes of organic material contained in the stream of waste material. Alternatively, the hydrolyzer vessel 42 may be described as being sized and configured to expose the stream of shredded MSW material to steam at a pressure of at least 120 psi and a temperature of at least 300 degrees F. for a time interval of at least 10 minutes. The hydrolyzer vessel 42 includes a hydrolyzer inlet 46 for receiving material and also includes a rotating shaft 44, such as a rotating spiked auger, which is rotated by a drive motor (not shown).

The outfeed assembly 50 is configured to discharge the stream of MSW material from a hydrolyzer outlet 48 of the hydrolyzer vessel 42 to a reduced pressure zone so that a rapid decompression of the stream of MSW material ruptures cell walls of the organic material thereby forming an aggregate cellulose pulp having an expanded surface area.

Hydrolyzer Infeed System

Figure 3:
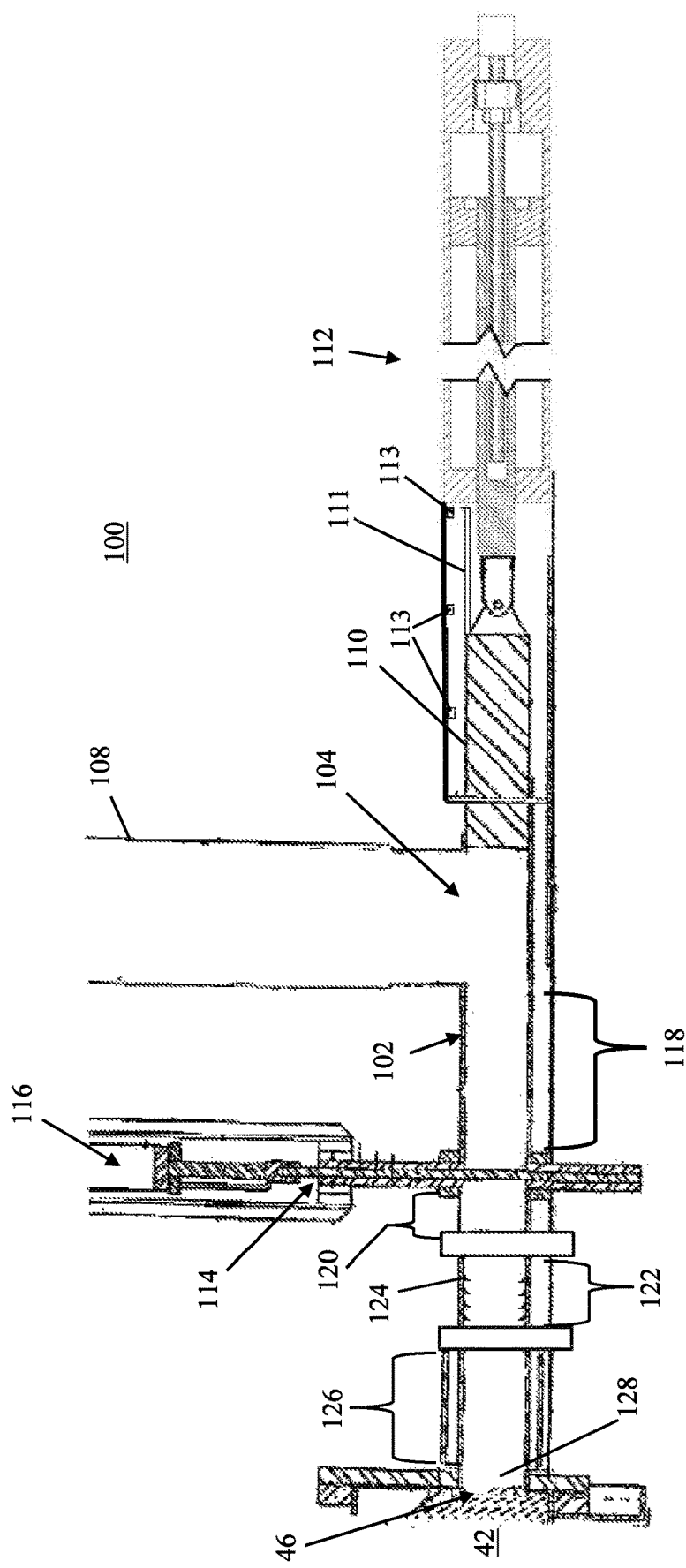
FIG. 3 is a cross-sectional side view of the hydrolyzer infeed assembly.

A first embodiment of the improved hydrolyzer infeed system disclosed herein is schematically illustrated in FIG. 3 and designated by the numeral 100. The system 100 is an apparatus for supplying waste material such as household garbage or municipal solid waste (MSW) into a hydrolyzer in a continuous manner. The hydrolyzer infeed system 100 as shown in FIG. 3 does not have any waste material present within the system so that internal components can be seen with clarity. Operational views of the infeed system 100 as shown in FIGS. 3A-3F and of infeed system 200 as shown in FIGS. 4A-4B illustrate operational steps with waste material present in the system.

As shown in FIG. 3, the infeed assembly 100 includes an infeed chamber 102 which has a chamber inlet 104 for receiving waste material 106 from an inlet chute 108. The incoming stream of waste material is indicated at 106, and in one embodiment that incoming stream of waste material is an unsorted collection of solid waste material collected from homes and other customers of a typical municipal trash collection system. The material has preferably been processed to remove non-organic components and then shredded to facilitate the processing in the hydrolyzer, as described for example in U.S. Pat. No. 9,562,322.

A ram 110 is disposed in the infeed chamber 102 and is operably connected to an actuator 112. The ram 110 moves within the infeed chamber to compress material against a moveable inlet gate 114 when the inlet gate is in the closed position and form a compressed material plug 130. The inlet gate 114 is operably connected to an actuator 116. The area of the infeed chamber located between the chamber inlet 104 and the gate 114 can be characterized as a compression zone 118 where relatively loose waste material is pressed together to lessen the bulk volume of, and to increase the density of, the waste material present.

Past the inlet gate 114 is a portion of the infeed chamber 102 that includes a smooth inner bore zone 120, a transition zone 122 including a plurality of frictional engagements 124, and a charge preheating zone 126. Compressed material in the form of a compressed material plug 130 pushed past the inlet gate 114 will sequentially flow through each of the inner bore zone 120, transition zone 122, and preheat zone 126 before passing through a chamber outlet 128 into a hydrolyzer inlet 46.

Figure 3A:
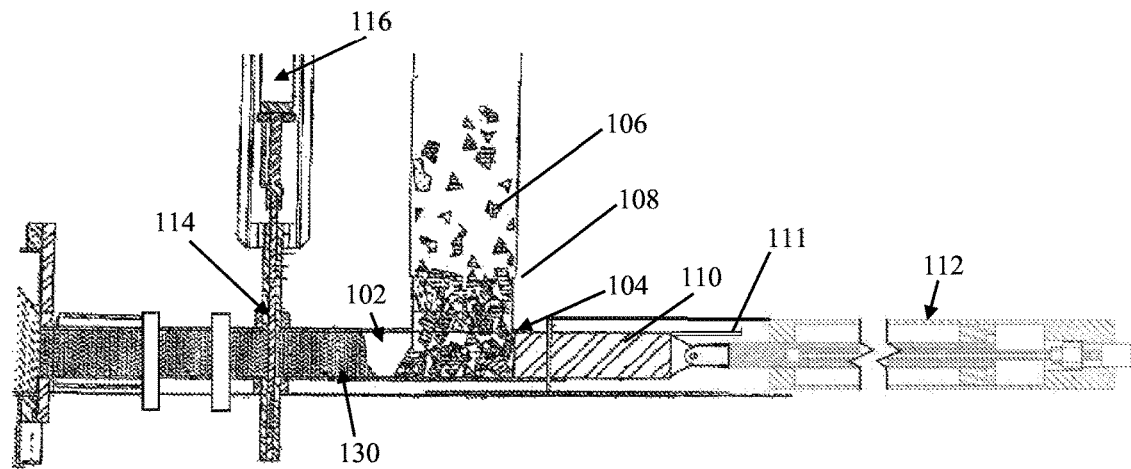
FIGS. 3A-3F are various operational views of the cross-sectional side view of the hydrolyzer infeed system.
Figure 3B:
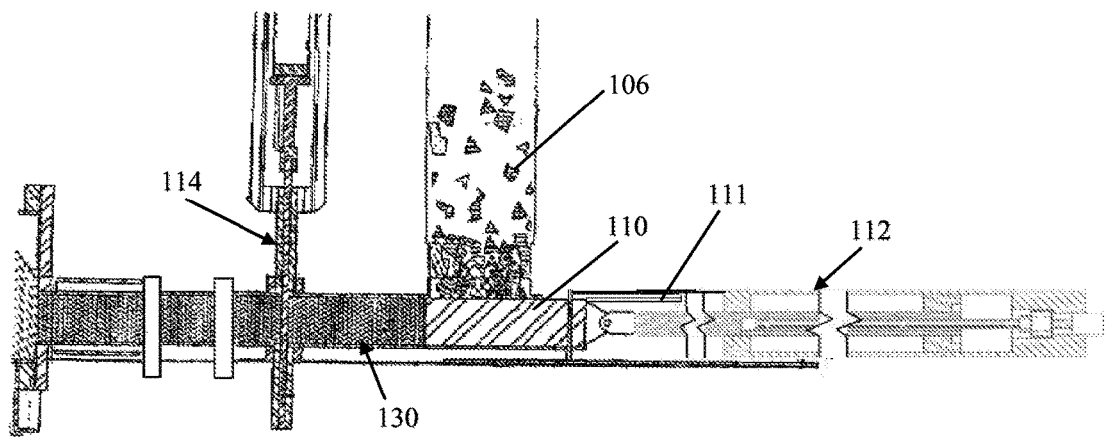

As shown in operational view FIG. 3A, the infeed assembly 100 includes the infeed chamber 102 which has the chamber inlet 104 for receiving waste material 106 from the inlet chute 108. The ram 110 is disposed in the infeed chamber 102 and is operably connected to the actuator 112. The ram 110 moves within the infeed chamber to compact material against the moveable inlet gate 114 when the inlet gate is in the closed position. In FIG. 3A, the ram is in a fully retracted position, leaving the chamber inlet 104 open for material to enter the infeed chamber 102. In FIG. 3B, the ram 110 moves to a compressing position to compress the material against the closed gate 114 and closes off the chamber inlet 104, preventing the inflow of additional material into the infeed chamber 102. In operation, the ram may repeatedly move back and forth between the fully retracted position and the compressing position to compress additional material from the inlet chute.

Figure 3C:
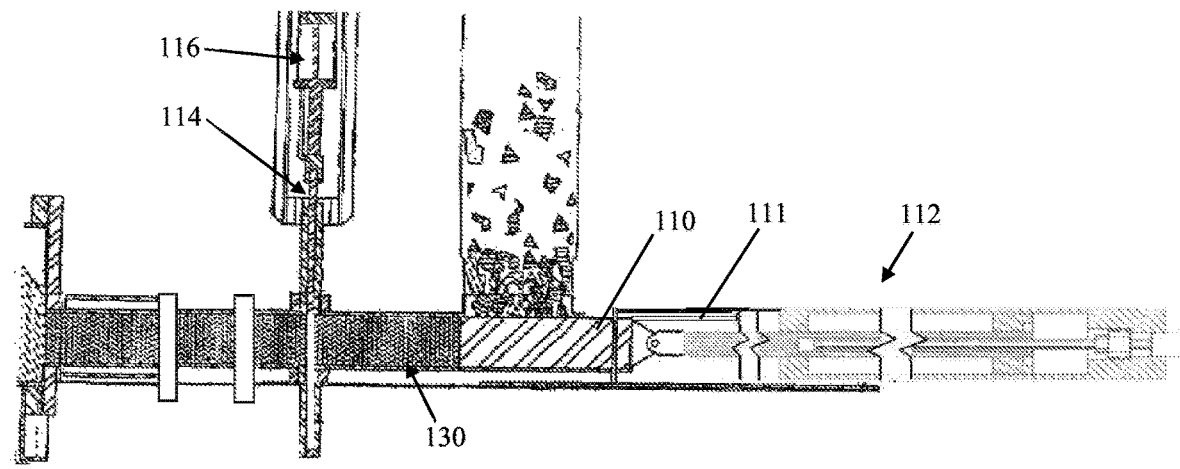
Figure 3D:
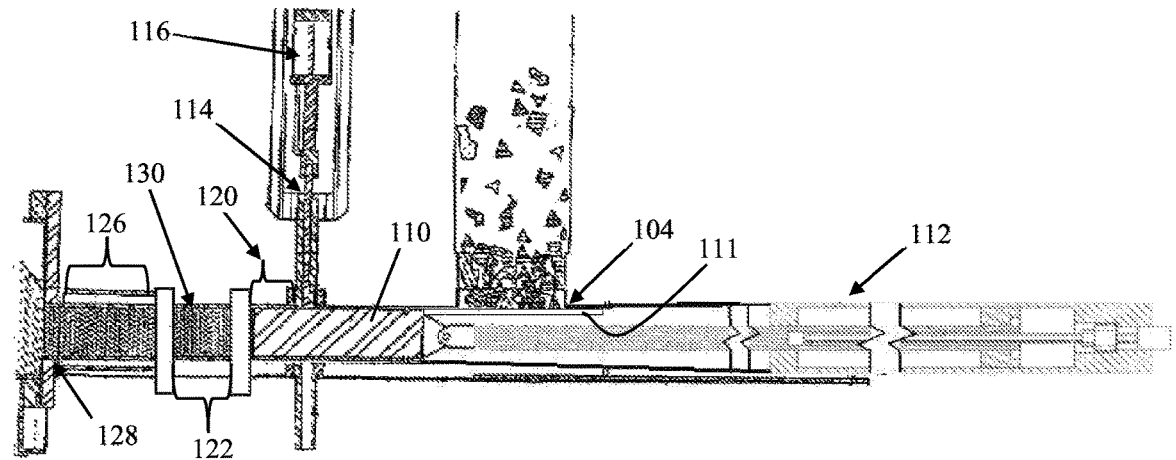
Figure 3E:
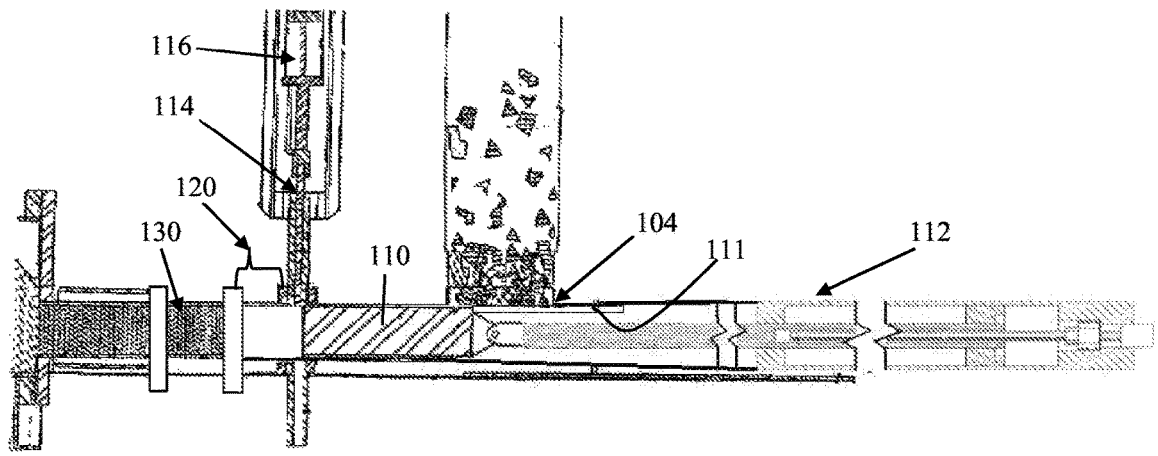

The ram 110 may have attached thereto a cover plate 111 extending rearwardly from the ram 110 a distance sufficient to block the chamber inlet 104 to prevent entry of material 106 into the infeed chamber 102 when the ram 110 is in a partially or fully extended position past the chamber inlet 104 as seen for example in FIGS. 3D and 3E.

The elevated pressure of the hydrolyzer 42 will tend to force the compressed material plug 130 back towards the chamber inlet 104 whenever the inlet gate 114 is in the open position. As discussed in greater detail below, the frictional engagements 124 and combined timing of the ram 110 position and gate 114 position prevent the compressed material plug 130 from being forced back towards the chamber inlet 104 of the infeed chamber 102.

FIG. 3C shows the inlet gate 114 moved to an open position. The inlet gate 114 is operably connected to the actuator 116 configured to move the inlet gate between the open and closed positions. Just prior to moving the inlet gate 114 to the open position, the ram 110 may be "backed off" to decrease the force by which the compressed material plug 130 is pressed against the inlet gate and allow the inlet gate to move to the open position. For example, the force by which the ram 110 compresses the plug 130 may be temporarily decreased. The position of the ram 110 may also be temporarily retracted to decrease the compressive force on the plug 126. The "backing off" of the ram 110 to allow the opening of the inlet gate 114 will be described in greater detail below with respect to a controller 302. Additionally, the ram 110 may be hydraulically locked in position to maintain the steam seal within the hydrolyzer.

As shown in FIG. 3D, the ram 110 presses the compressed material plug 130 through the inlet gate 114, and the ram 110 extends to a fully extended position past the inlet gate into the inner bore zone 120. The fully extended position of the ram 110 may be in a range anywhere from one (1) inch to eight (8) inches past the inlet gate 114 towards the chamber outlet 128. In some instances, the fully extended position of the ram 110 may extend partially into the inner bore zone 120, and in some instances, may extend the entire length of the inner bore zone 120 such that the ram 110 is at the transition zone 122. The inner bore zone 120 may be adapted to receive the ram 110 with a tight circumferential fit such that no compressed waste material can escape back past the inlet gate 114 in the direction of the chamber inlet 104.

When the ram 110 is moved to an extended position, the ram 110 will block the inflow of waste material 106 from the inlet chute 108 through the chamber inlet 104 to the infeed chamber 102. The ram 110 blocking the chamber inlet 104 when the ram is in an extended position allows the ram to compress material to form a compressed material plug 130 and to press the plug past the inlet gate 114 without additional waste material 106 entering the infeed chamber 102 until the ram moves to the fully retracted position.

Figure 8A:
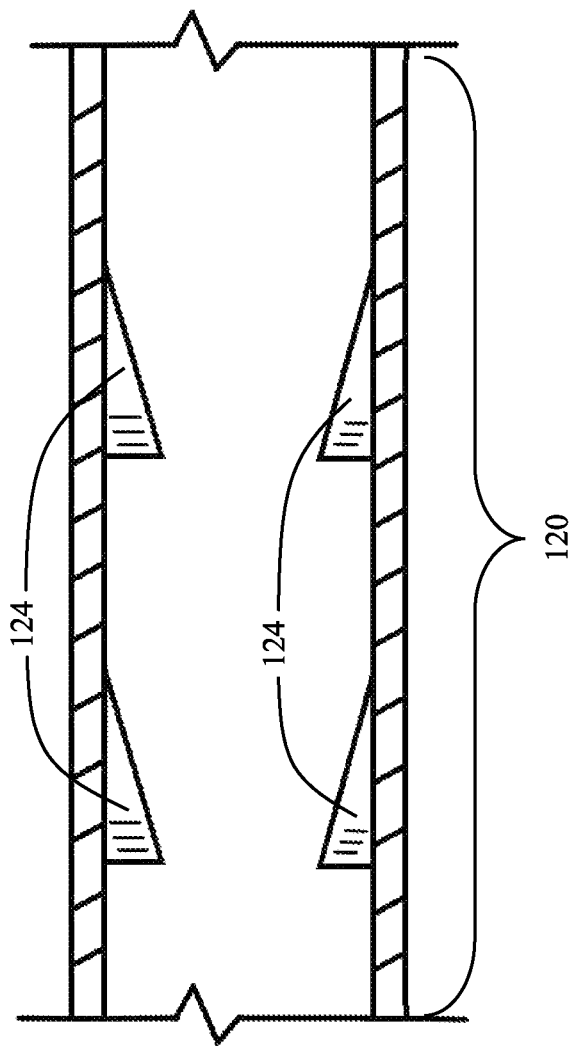
FIG. 8A is a schematic enlarged side elevation sectioned view of the transition zone showing the details of the frictional engagements which inhibit reverse movement of the plug back out of the transition zone.
Figure 8B:
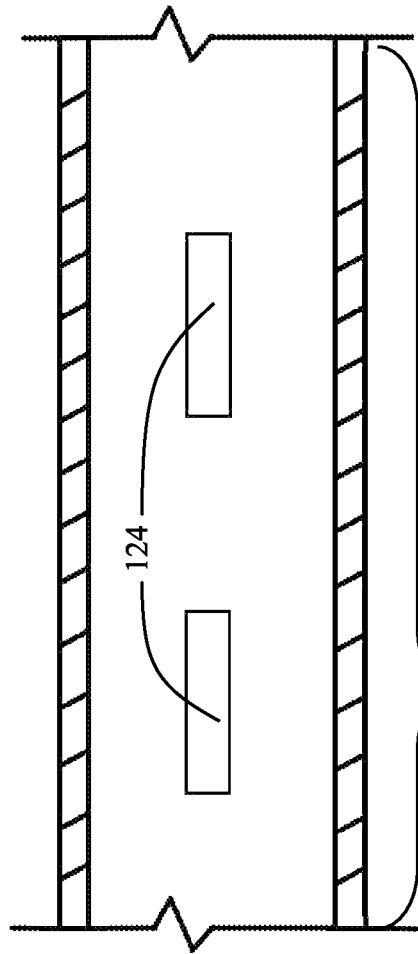
FIG. 8B is a sectioned view taken along line 8B-8B of FIG. 8A.

As further shown in FIG. 3D, once the ram 110 presses the compressed material plug 130 past the inner bore zone 120 towards the chamber outlet 128, a portion of the compressed material plug is positioned within the transition zone 122. The frictional engagements 124 of the transition zone 122 may prevent the compressed material plug 130 from being forced back through the inlet gate 114 or towards the chamber inlet 104. The frictional engagements 124 may be at least one frictional protuberance As shown in FIGS. 8A and 8B the frictional engagements 124 may take the form of triangular shaped fins projecting into the transition zone 122, with the fin increasing in height toward the hydrolyzer. The length of the transition zone 122 may extend in a range anywhere from twelve (12) to eighteen (18) inches from the inner bore zone 120 to the charge preheating zone 126. In one instance, the extended position of the ram 110 as shown in FIG. 3D may be the fully extended position.

As shown in FIG. 3E, after the ram 110 has pushed the compressed material plug 130 past the inlet gate 114, the ram retracts back to a position just inside the inlet gate 114 between the inlet gate and the chamber inlet 104. Once the ram 110 reaches the position just inside of the inlet gate 114, the inlet gate moves to the closed position to prevent the escape of compressed material plug 130 past the inner bore zone 120 to the side of the inlet gate 114 near the chamber inlet 104. The position of the ram 110 just inside of the inlet gate 114 may be within a range of two (2) inches of the gate.

Figure 3F:
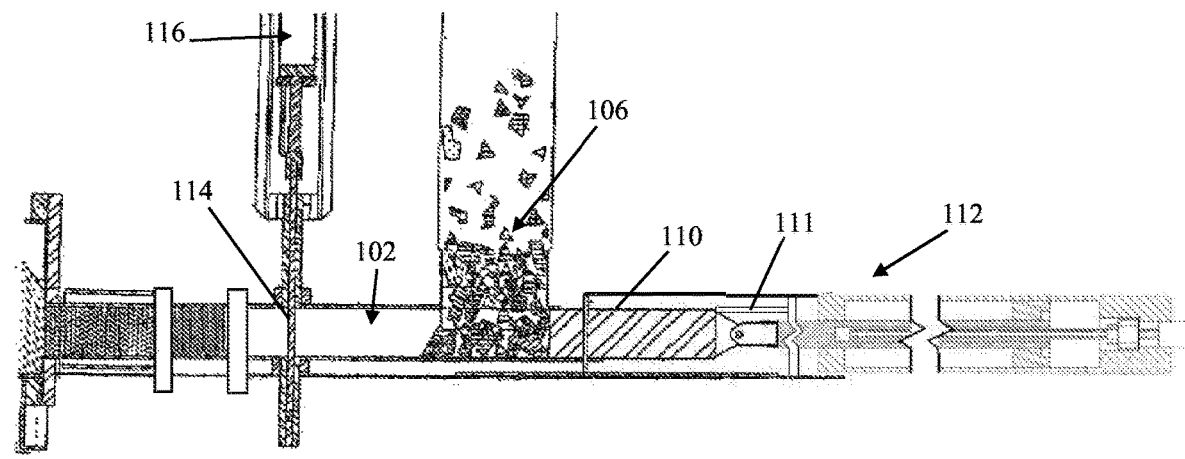

As shown in FIG. 3F, after the inlet gate 114 moves to the closed position the ram 110 retracts to a fully retracted position, so the infeed chamber 102 may receive additional waste material 106.

Hydraulic "Smart" Cylinders

The actuator 112 operably connected to the ram 110 (the ram actuator) may be provided with an actuator position sensor 112S operably associated with the actuator 112. The actuator position sensor 112S is configured to generate a position signal representative of the position of the ram actuator 112. Accordingly, the position signal will also be representative of the corresponding position of the ram 110 operably connected to the actuator 112.

The generated position signal is a continuous position signal representative of the position of the actuator 112 at all positions between the actuator fully extended position and the actuator fully retracted position. For example, the continuous ram 110 position signal may be representative of the position of the ram actuator 112 anywhere at or in between the fully extended position and the fully retracted position.

In one embodiment, the actuator 112 may be a "smart" hydraulic cylinder having an integral extension sensor associated therewith.

Figure 4:
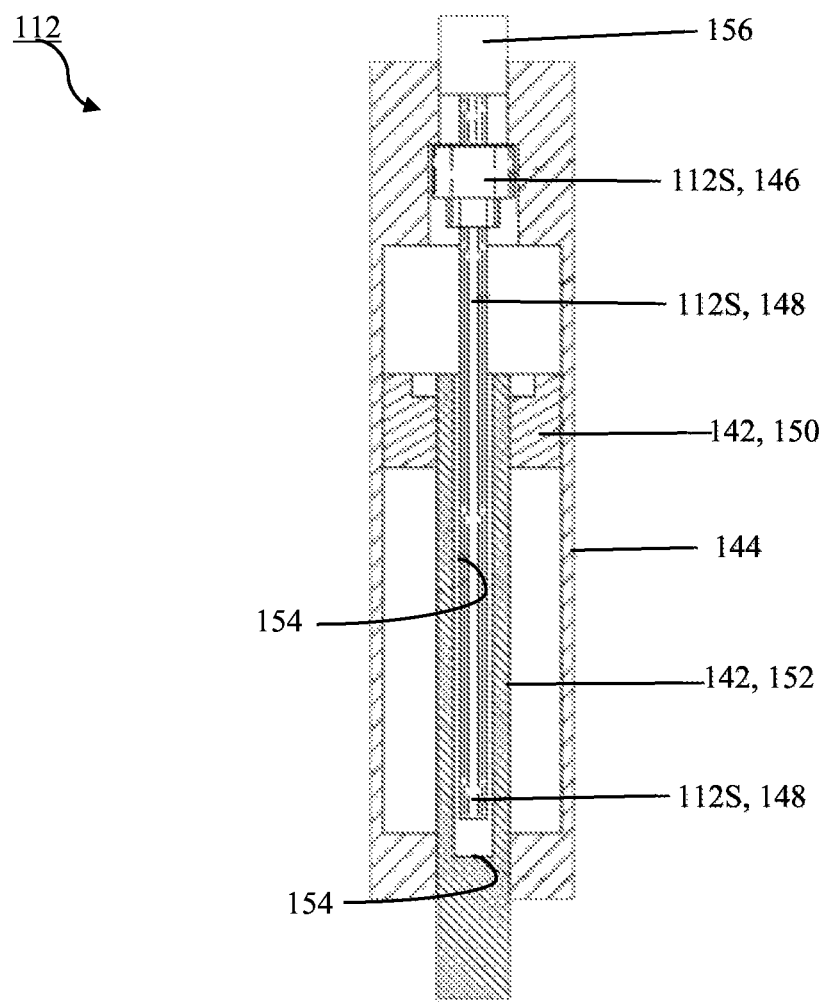
FIG. 4 is a schematic elevation sectioned view of a representative hydraulic "smart" cylinder.

A representative construction of such a "smart" hydraulic cylinder is shown in FIG. 4, and the details of a "smart" hydraulic extension actuator 112 will be described by way of example. FIG. 4 may also be representative of the internal construction of any of the other actuators herein described when those actuators are implemented as "smart" cylinders. In the illustrated embodiment, the actuator 112 includes an integrated sensor 112S configured to provide a signal corresponding to an extension of a piston member 142 relative to a cylinder member 144 of the actuator 112.

The sensor 112S includes a position sensor electronics housing 146 and a position sensor coil element 148.

The piston portion 142 of actuator 112 includes a piston 150 and a rod 152. The piston 150 and rod 152 have a bore 154 defined therein, within which is received the position sensor coil element 148.

The actuator 112 is constructed such that a position signal is provided at connector 156 representative of the position of the piston 142 relative to the position sensor coil element 148.

Such smart cylinders may operate on several different physical principles. Examples of such smart cylinders include but are not limited to magneto-strictive sensing, magneto-resistive sensing, resistive (potentiometric) sensing, Hall effect sensing, sensing using linear variable differential transformers, and sensing using linear variable inductance transducers.

Figure 5:
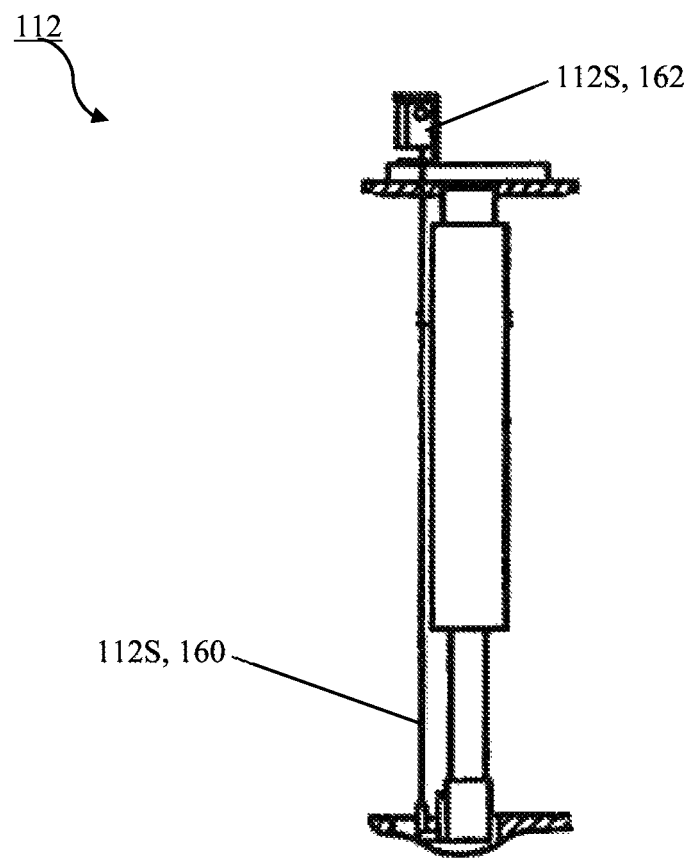
FIG. 5 is a schematic elevation sectioned view of a representative actuator and associated actuator wire rope position sensor.

In another embodiment of the actuator 112 as shown in FIG. 5, actuator position sensor 112S is a wire rope sensor. The actuator 112 is on one end attached to the ram 110 and on the other end is attached to the machine frame of the hydrolyzer infeed system (not shown). The actuator 112 is provided with a position sensor 112S for measuring the position of the actuator. The actuator position sensor 112S includes a wire-rope 160 that is attached at the ram 110 and is, on the other hand, coupled with a wire-rope sensor 162 that is attached at the machine frame of the hydrolyzer infeed system. The stroke path of the hydraulic cylinder can be measured by means of the wire-rope sensor 162. The wire-rope sensor 162, and the extension signal produced by the same, is ultimately also suitable for being converted into a velocity signal or acceleration signal by including a time measurement.

Also, some aspects of the present invention may be utilized with an actuator position sensor of a non-continuous nature. For example, as schematically shown in FIG. 3, the stroke path of the actuator 112 may be detected with a series of discrete position sensors 113 operably associated with the ram cover plate 111 for detecting an incremental position of the ram cover plate 111 and the attached ram 110 relative to the infeed chamber 102. The discrete positions sensors 113 may be limit switches, proximity sensors, or other known discrete sensors.

Figure 7:
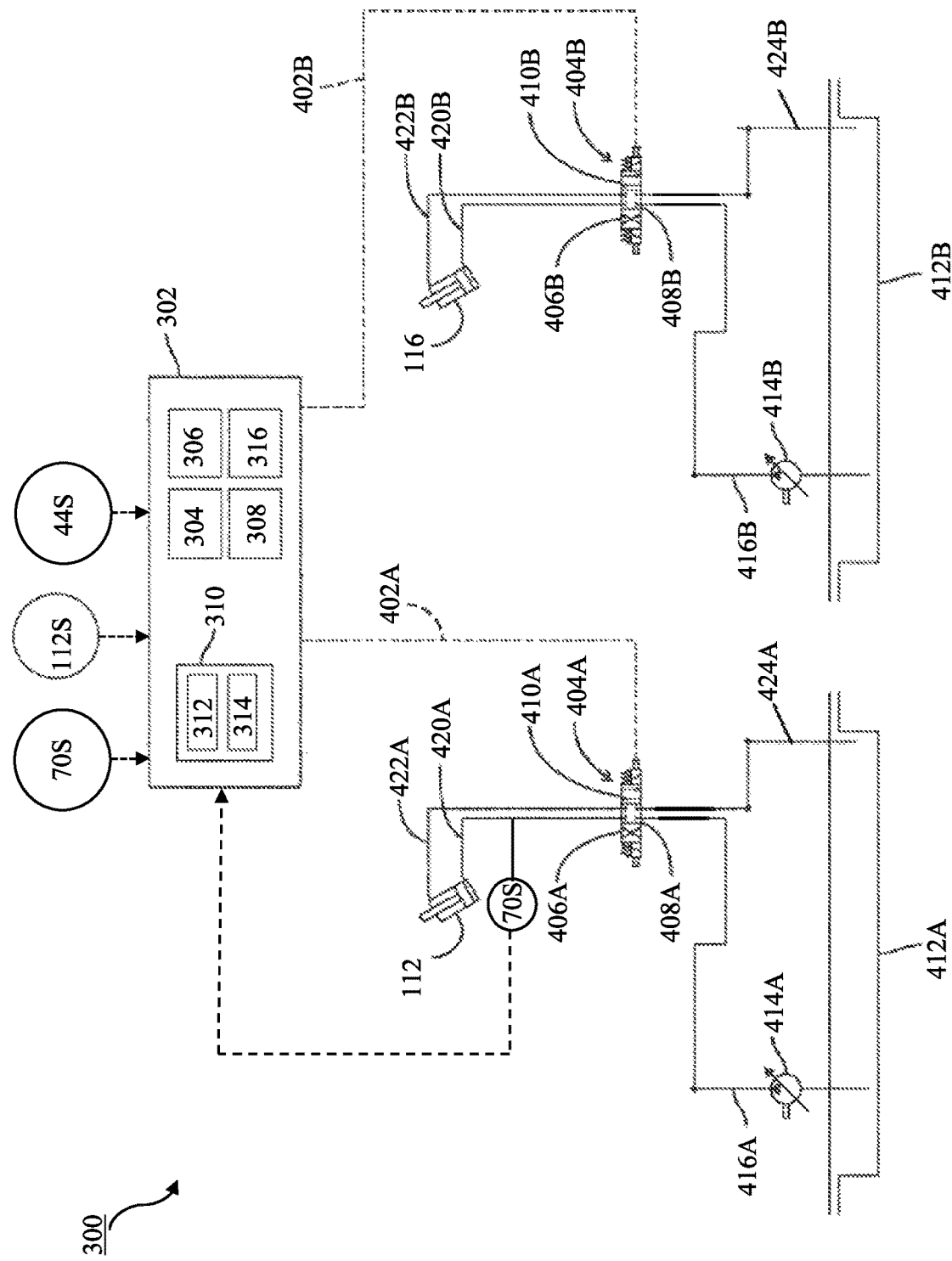
FIG. 7 is a schematic illustration of a hydraulic power system and electronic control system of the of the hydrolyzer infeed system of FIG. 3 showing the various sensor inputs to the controller and the various command signal outputs from the controller to the various actuators of the hydrolyzer infeed system.

A controller 302 is operably connected to the actuator position sensor 112S. The generated position signal of the actuator position sensor 112S and associated actuator 112 is transmitted to the controller 302 by means of a signal line. The controller 302 receives generated position signals from the actuator position sensor 112S, as indicated in FIG. 7 and as discussed below.

The combination of the actuator position sensor 112S, associated actuator 112, and the controller 302 allows for control of the precise positioning of the ram 110. Such precise positioning of the ram 110 allows for various benefits as discussed hereinafter, including control of the compaction of waste material 106 within the infeed chamber compression zone 118. For instance, if the rate of infeed of waste material 106 into the infeed chamber 102 is relatively low, the ram 110 may be extended relatively further in order to compress the waste material. Additionally, if a compressed material plug 130 with greater bulk density is desired, the ram 110 may be extended further to compress more waste material in a smaller volume within the compression zone 118. As discussed in greater detail below, the controller 302 may also utilize input from a force sensor 70S to control the force applied to the ram 110 during various operations, including compressing waste material.

Figure 6A:
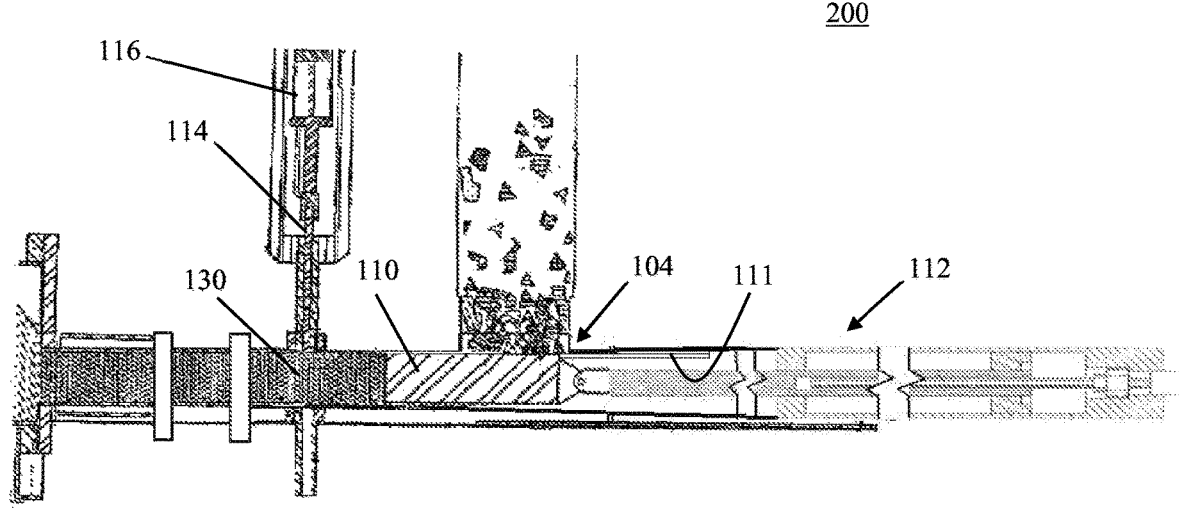
FIGS. 6A-6B are various operational views of a cross-sectional side view of an alternative embodiment of the hydrolyzer infeed system.
Figure 6B:
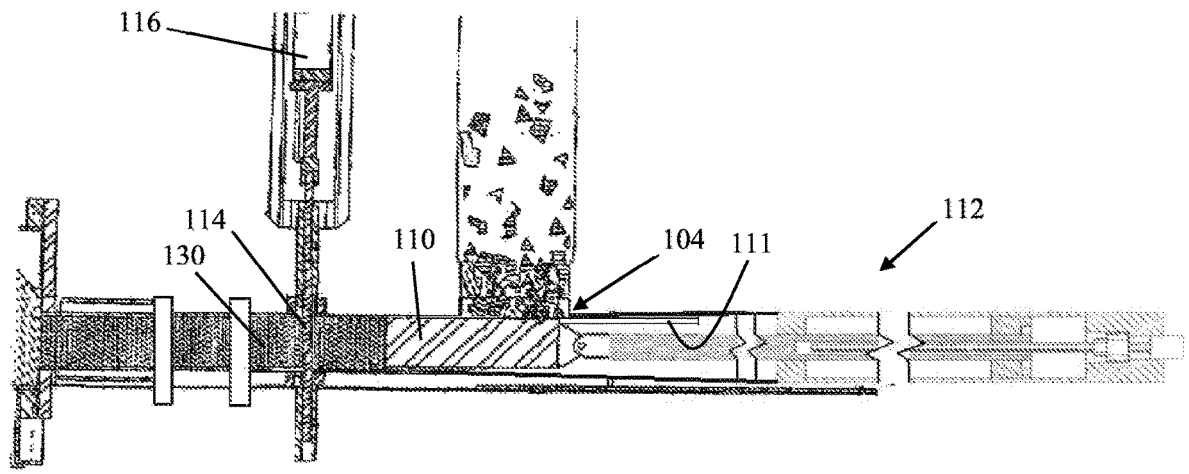

Alternative Embodiment of FIGS. 6A-6B

The precise positioning of the ram 110 which is achievable using a hydraulic smart cylinder for the ram actuator 112 is an advantage which can be enjoyed even without the additional feature of the ram 110 extending through and past the gate 114. Thus, a ram actuator 112 in the form of a hydraulic smart cylinder may be used with an infeed system otherwise similar to the prior art system 10 of FIGS. 1A-1E. Such an alternative infeed system 200 is shown in FIGS. 6A-6B.

The system 200 is in large part similar to the system 100 and the like structures are identified by the same numbers used in FIG. 3 and their descriptions will not be repeated.

The hydrolyzer infeed system 200 allows waste material 106 to enter the infeed chamber 102 through the inlet chute 108 in the same manner as the hydrolyzer infeed system 100 as shown in FIG. 3A. The ram 110 moves within the infeed chamber 102 to compress material against the inlet gate 114 to form a compressed material plug 130 when the inlet gate is in the closed position in the same manner as shown in FIG. 3B. The hydrolyzer infeed system 200 also moves the inlet gate 114 to the open position to allow the ram 110 to push the compressed plug 130 toward the chamber outlet 128 in the same manner as shown in FIG. 3C.

FIG. 6A illustrates the infeed system 200 when the ram 110 is moved to the fully extended position which in this case stops short of the gate 114. In FIG. 6A the gate 114 is in the open position, and it will be appreciated that as the ram 110 moved from a retracted or intermediate position like that of FIGS. 3A-3C, to the position of FIG. 6A, the plug 130 is pushed partially through the open gate 114. Then when the gate 114 is closed, as shown in FIG. 6B, the plug 130 is cut into two pieces by the gate 114. Then the portion of the plug 130 adjacent ram 110 is further built up by retracting the ram, allowing more material to drop into the inlet 104, and extending the ram to compact the additional material into the plug 130 against the closed gate 114. During this process, as the plug 130 is built up against a closed gate 114, the hydraulic smart cylinder type ram actuator 112 can precisely control the compaction of the plug 130 so as to control the density of the plug 130. Then the gate 114 is again opened as shown in FIG. 6A and the actuator 112 and ram 110 are extended to the fully extended position of FIG. 6A to push a further portion of the plug 130 past the open gate 114.

Control System

As schematically illustrated in FIG. 7, the hydrolyzer infeed system includes a control system 300 including a controller 302. The controller 302 may be part of the machine control system of the hydrolyzer infeed system, or it may be a separate control module.

The controller 302 may for example be mounted in a control panel 310 located at the hydrolyzer 42. The controller 302 is configured to receive input signals from the various sensors. The signals transmitted from the various sensors to the controller 302 are schematically indicated in FIG. 7 by lines connecting the sensors to the controller with an arrowhead indicating the flow of the signal from the sensor to the controller 302.

For example, position signals from the actuator position sensor such as 112S will be received so that the controller can monitor the extension of the actuator 112.

Similarly, the controller 302 will generate control signals for controlling the operation of the various actuators discussed above, which control signals are indicated schematically in FIG. 7 by lines connecting the controller 302 to the various actuators with the arrow indicating the flow of the command signal from the controller to the respective actuators. It will be understood that for control of a hydraulic cylinder type actuator the controller 302 will send an electrical signal to an electro/mechanical control valve 404A, 404B which controls flow of hydraulic fluid to and from hydraulic cylinders 112, 116 as further described below.

Controller 302 includes or may be associated with a processor 304, a computer readable medium 306, a data base 308 and an input/output module or control panel 310 having a display 312. An input/output device 314, such as a keyboard, joystick or other user interface, is provided so that the human operator may input instructions to the controller. It is understood that the controller 302 described herein may be a single controller having all of the described functionality, or it may include multiple controllers wherein the described functionality is distributed among the multiple controllers.

Various operations, steps or algorithms as described in connection with the controller 302 can be embodied directly in hardware, in a computer program product 316 such as a software module executed by the processor 304, or in a combination of the two. The computer program product 316 can reside in RAM memory, flash memory, ROM memory, EPROM memory, EEPROM memory, registers, hard disk, a removable disk, or any other form of computer-readable medium 306 known in the art. An exemplary computer-readable medium 306 can be coupled to the processor 304 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Particularly the controller 302 may be programmed to receive position signals from the actuator position sensor 112S of the ram actuator 112 and to send control signals to control the extension of the ram actuator 112 at least in part in response to the position signals. Additionally, the controller 302 may be programmed to receive signals from a shaft load sensor 44S and a force sensor 70S as described hereinafter.

With respect to the ram 110, the controller 302 operably associated with the ram actuator 112 generates a ram control signal to control a position of the ram actuator 112 and corresponding position of the ram 110. The controller 302 may control the position of the ram 110 at the extended or retracted position of the ram 110, and anywhere between the fully retracted position and the fully extended position.

The controller 302 is also operably associated with the gate actuator 116 and generates a gate control signal to control a position of the gate actuator 116 and corresponding position of the gate 114. In particular, the controller 302 may control the position of the gate 114 between the open position and the closed position.

The controller 302 may be connected to the shaft load sensor 44S and may be configured to receive a shaft load signal generated by the shaft load sensor 44S. The shaft load sensor 44S corresponds to a load on a motor rotating the shaft 44 of the hydrolyzer 42. The shaft load sensor 44S determines the load on the motor rotating the shaft 44 by measuring the current or amperage drawn by the motor, which is indicative of the load on the shaft of the motor. The controller may be configured to indicate the shaft load to the operator and alert the operator when the shaft load exceeds a predetermined threshold.

The controller 302 may also be connected to a force sensor 70S. The force sensor 70S is configured to generate a force signal corresponding to a compressive force applied by the ram 110 to the compressed material plug 130. The controller 302 connected to the force sensor 70S receives the force signal. The force sensor 70S determines the compressive force applied by the ram 110 by measuring the pressure inside the hydraulic system as schematically illustrated in FIG. 7. For example, the force sensor 70S may be a pressure sensor in the hydraulic system between a three-way valve 404A and the actuator 112. The controller 302 may be configured to control the compressive force applied by the ram 110 to the compressed material plug 130. The controller may also be configured to indicate the compressive force applied by the ram 110 to the operator and allow operator input to control the compressive force. For example, the controller may be configured to control the compressive force of the ram 110 at or in a range from a predetermined value.

FIG. 7 also schematically illustrates an embodiment of a hydraulic control diagram for operation of the ram actuator 112 and the gate actuator 116. The ram actuator 112 and the gate actuator 116 may each be double acting hydraulic cylinders. Hydraulic fluid under pressure is provided to the cylinders from a source such as a variable flow hydraulic pump 414A, 414B, and fluid discharged from the cylinders is returned to a hydraulic reservoir 412A, 412B via a return line 424A, 424B. Although FIG. 7 shows individual pumps 414A, 414B and reservoirs 412A, 412B for each actuator, a common pump and reservoir may be used for both actuators. The pumps 414A and 414B may be high/low output pumps, but a variable flow pump is preferred for energy efficiency.

Directional control of hydraulic fluid into and out of the actuators 112 and 116 is controlled by solenoid actuated variable flow three-way valves 404A and 404B, respectively.

Hydraulic fluid under pressure from pump 414A flows through a hydraulic fluid supply line 416A, to the variable flow three-way valve 404A. This variable flow valve may also be referred to as a proportional valve. The valve 404A can control both the direction and the rate of flow of fluid to the hydraulic cylinder 112. The pump 414B, fluid supply line 416B, and valve 404B corresponding to cylinder 116 operate in the same manner.

The three-way valve 404A associated with the actuator 112 has a first position 406A wherein hydraulic fluid under pressure is provided to an upper end of the cylinder via hydraulic line 422A and received from a lower end of the cylinder via hydraulic line 420A for retraction of a piston of the hydraulic cylinder. The three-way valve 404A can be moved to a second position 410A in which the direction of flow is reversed to extend the piston. The three-way valve 404A can be moved to a third position 408A wherein flow of hydraulic fluid to and from the hydraulic cylinder is blocked. It is noted that the hydraulic lines 420A and 422A may be referred to as first and second hydraulic lines 420A and 422A, but such designation is for identification only and does not imply any specific functionality. The valve 404B associated with actuator 116 operates in the same manner.

The controller 302 can control the volume and direction of hydraulic flow to and from the ram actuator 112 and the gate actuator 116 via control signals sent to three-way valves 404A and 404B, respectively, over control lines 402A and 402B.

In one embodiment the actuator position sensor 112S may be configured to generate a position signal corresponding to the amount of extension of the actuator. And the controller 302 may be configured to receive the position signal to send control signals to the respective actuators, in part based on the position signal for the actuator.

For example, the controller 302 may be configured to control the gate actuator 116 and the ram actuator 112, and thus the gate 114 and ram 110, to form a compressed material plug 130 by the following:

(a) closing the gate 114 (FIG. 3A);
(b) receiving material 106 through the chamber inlet 104 into the infeed chamber 102 between the ram 110 and the closed gate 114 (FIG. 3A);
(c) extending the ram 110 towards the closed gate 114 and compressing the material 106 between the ram 110 and the closed gate 114 to form the compressed material plug 130 (FIG. 3B);
(d) opening the gate 114 (FIG. 3C);
(e) further extending the ram 110 past the open gate 114 to an extended ram position between the open gate 114 and the chamber outlet 128 thereby pushing the compressed material plug 130 past the open gate 114 (FIG. 3D);
(f) retracting the ram 110 back to an intermediate position between the open gate 114 and the chamber inlet 104, the ram in the intermediate position may be within two inches of the gate 114 (FIG. 3E); and
(g) reclosing the gate 114 (FIG. 3F).

The specific position of each of the gate 114 and the ram 110 in the above process is described with reference to the operational views of the hydrolyzer infeed system as discussed with respect to FIGS. 3A-3F.

The controller 302 may be configured to further control the ram actuator 112 and ram 110 by, between steps (c) and (d), reducing a force of the ram 110 against the compressed material plug 130 (FIG. 3B).

The controller 302 may be configured to further control the ram actuator 112 and ram 110 by (h) after step (g), fully retracting the ram 110 to the fully retracted position (FIG. 3F).

The controller 302 may be configured to repeat steps (b)-(h) above to generate a series of compressed material plugs.

The controller may be additionally configured to, before step (d), repeat steps (b)-(c) (FIGS. 3A-3B) to compress additional material 106 between the ram 110 and the closed gate 114 to increase the size and/or bulk density of the compressed material plug 130.

The controller 302 may be configured to control a cycle time for repeating steps (b)-(h). The controller 302 may control the cycle time in part based on the shaft load signal. In this manner by controlling the cycle time, the controller 302 is configured to control an infeed rate of material into the hydrolyzer 42 in part based on the shaft load signal.

The controller 302 may be configured to, during step (e), move the ram 110 in the extended ram position to a distance in a range from 1 to 8 inches past the gate 114 as shown in FIG. 3D.

The controller 302 may also be configured to, during step (f) and before step (g), prevent the return movement of the compressed material plug 130 back to the gate 114 by the force of frictional engagements 124 between the compressed material plug and the infeed chamber 102 as shown in FIGS. 3D-3E.

The controller 302 may be configured to, during step (f), position the ram 110 within two inches of the gate 114 when the ram is moved to the intermediate position as shown in FIG. 3E.

In performing steps (c), (e), and (f), the controller 302 may be configured to measure a position of the actuator 112 with the actuator position sensor 112S, and control the movement of the actuator and the corresponding movement of the ram 110 at least in part in response to signals from the actuator position sensor 112S.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A hydrolyzer infeed system, comprising:
   a hydrolyzer having a hydrolyzer inlet;
   an infeed chamber having a chamber inlet for receiving material and having a chamber outlet communicated with the hydrolyzer inlet;
   an inlet gate disposed in the infeed chamber and movable between a closed position and an open position, the infeed chamber being blocked between the chamber inlet and the chamber outlet when the inlet gate is in the closed position, and the infeed chamber being open between the chamber inlet and the chamber outlet when the inlet gate is in the open position;
   a ram disposed to reciprocate in the infeed chamber for compressing the material against the gate on a side of the gate opposite from the chamber outlet when the gate is in the closed position, and for moving the compressed material past the gate when the gate is in the open position; and
   an actuator operably connected to the ram and configured to move the ram between a retracted ram position and a fully extended ram position, the chamber inlet being open for receiving the material when the ram is in the retracted ram position, and the ram extending past the gate toward the chamber outlet when the ram is in the fully extended ram position;
   wherein the infeed chamber between the inlet gate and the chamber outlet includes an inner bore zone adjacent the inlet gate and adapted to receive a portion of the ram in the fully extended position, and a transition zone disposed between the inner bore zone and the chamber outlet; and
   wherein the transition zone includes at least one frictional protuberance configured to resist return movement of the compressed material toward the chamber inlet.

2. The hydrolyzer infeed system of claim 1, wherein:
   when the ram is in the fully extended ram position the ram extends a distance in a range of from 1 to 8 inches past the gate.

3. The hydrolyzer infeed system of claim 1, further comprising:
   a controller operably associated with the actuator, the controller being configured to generate a control signal to control a position of the actuator and a corresponding position of the ram between the retracted ram position and the fully extended ram position.

4. The hydrolyzer infeed system of claim 3, further comprising:
   an actuator position sensor operably associated with the actuator and configured to generate a position signal representative of the position of the actuator and the corresponding position of the ram between the retracted ram position and the fully extended ram position; and
   wherein the controller is operably connected to the actuator position sensor for receiving the position signal, the controller being configured to generate the control signal to control the position of the actuator and the ram at least in part in response to the position signal.

5. The hydrolyzer infeed system of claim 4, wherein:
   the actuator position sensor is configured such that the position signal is a continuous position signal representative of the position of the actuator and the corresponding position of the ram at all positions between the retracted ram position and the fully extended ram position.

6. The hydrolyzer infeed system of claim 4, wherein:
   the actuator is a hydraulic smart cylinder and the actuator position sensor is integrally provided in the hydraulic smart cylinder.

7. The hydrolyzer infeed system of claim 4, wherein:
   the controller is operably associated with the gate, the controller being configured to generate a gate control signal to control a position of the gate; and
   the controller is configured to control the gate and the actuator such that a compressed material plug is formed by:
   (a) closing the gate;
   (b) receiving material through the chamber inlet into the infeed chamber between the ram and the closed gate;

(c) extending the ram towards the closed gate and compressing the material between the ram and the closed gate to form the compressed material plug;
(d) opening the gate;
(e) further extending the ram past the open gate to an extended ram position between the open gate and the chamber outlet thereby pushing the compressed material plug past the open gate;
(f) retracting the ram back to an intermediate position between the open gate and the chamber inlet; and
(g) reclosing the gate.

8. The hydrolyzer infeed system of claim 7, wherein the controller is further configured to:
between steps (c) and (d), reduce a force of the ram against the compressed material plug.

9. The hydrolyzer infeed system of claim 7, wherein the controller is further configured to:
(h) after step (g), retract the ram to the fully retracted position.

10. The hydrolyzer infeed system of claim 9, wherein the controller is further configured to:
repeat steps (b)-(h) to generate a series of compressed material plugs.

11. The hydrolyzer infeed system of claim 10, further comprising:
a shaft load sensor configured to generate a shaft load signal corresponding to a loading on a rotating shaft of the hydrolyzer; and
wherein the controller is connected to the shaft load sensor to receive the shaft load signal, and the controller is configured to control a cycle time for repeating steps (b)-(h) to control an infeed rate of material into the hydrolyzer at least in part in response to the shaft load signal.

12. The hydrolyzer infeed system of claim 7, wherein the controller is further configured to:
before step (d), repeat steps (b)-(c) to compress additional material between the ram and the closed gate to increase a size of the compressed material plug.

13. The hydrolyzer infeed system of claim 7, wherein the controller is further configured such that:
in step (f) the ram is within two inches of the gate when the ram is in the intermediate position.

14. The hydrolyzer infeed system of claim 3, further comprising:
a force sensor configured to generate a force signal corresponding to a compressive force applied by the ram to the compressed material plug; and
wherein the controller is connected to the force sensor to receive the force signal, and the controller is configured to control the compressive force applied by the ram to the compressed material plug.

15. The hydrolyzer infeed system of claim 1, wherein:
the infeed chamber includes a charge preheating zone adjacent the chamber outlet, and the transition zone is disposed between the inner bore zone and the charge preheating zone.

* * * * *